US012633063B2

(12) United States Patent
Chen et al.

(10) Patent No.: US 12,633,063 B2
(45) Date of Patent: May 19, 2026

(54) METHODS AND APPARATUS FOR DETERMINING AND USING CONTROLLABLE DIRECTIONS OF GAN SPACE

(71) Applicant: L'Oreal, Paris (FR)

(72) Inventors: Zikun Chen, Toronto (CA); Ruowei Jiang, Toronto (CA); Brendan Duke, Toronto (CA); Parham Aarabi, Richmond Hill (CA)

(73) Assignee: L'Oreal, Paris (FR)

( * ) Notice: Subject to any disclaimer, the term of this patent is extended or adjusted under 35 U.S.C. 154(b) by 221 days.

(21) Appl. No.: 18/227,546

(22) Filed: Jul. 28, 2023

(65) Prior Publication Data

US 2024/0037870 A1      Feb. 1, 2024

Related U.S. Application Data

(60) Provisional application No. 63/392,905, filed on Jul. 28, 2022.

(30) Foreign Application Priority Data

Oct. 20, 2022    (FR) ...................................... 2210849

(51) Int. Cl.
*G06T 19/00* (2011.01)
*G06N 3/045* (2023.01)
(Continued)

(52) U.S. Cl.
CPC ........... *G06T 19/006* (2013.01); *G06N 3/045* (2023.01); *G06N 3/0464* (2023.01); *G06N 3/0475* (2023.01); *G06N 3/094* (2023.01)

(58) Field of Classification Search
None
See application file for complete search history.

(56) References Cited

U.S. PATENT DOCUMENTS

2015/0254289 A1*  9/2015  Junkergard ........... G06F 16/283
                                                    707/738
2022/0207786 A1*  6/2022  Ren ........................ G06V 40/10
(Continued)

FOREIGN PATENT DOCUMENTS

JP        2021-111372 A      8/2021
JP        2022-519003 A      3/2022

OTHER PUBLICATIONS

Huiting Yang et al. "Discovering Interpretable Latent Space Directions of GANs Beyond Binary Attributes", 2021, IEEE/CVF Conference on Computer Vision and Pattern Recognition, pp. 12177-12185 (Open Access Version, provided by Computer Vision Foundation) (Year: 2021).*

(Continued)

*Primary Examiner* — Michael J Cobb
(74) *Attorney, Agent, or Firm* — Christensen O'Connor Johnson Kindness PLLC

(57) ABSTRACT

Methods, apparatus and techniques herein relates to determining directions in GAN latent space and obtaining disentangled controls over GAN output semantics, for example, to enable use of such to generating synthesized images such as for use to train another model or create an augmented reality The methods, apparatus and techniques herein, in accordance with embodiments, utilize the gradient directions of auxiliary networks to control semantics in GAN latent codes. It is shown that minimal amounts of labelled data with sizes as small as 60 samples can be used, which data can be obtained quickly with human supervision. It is also shown herein, in accordance with embodiments, to select important latent code channels with masks during manipulation, resulting in more disentangled controls.

19 Claims, 9 Drawing Sheets

(51) Int. Cl.
  G06N 3/0464 (2023.01)
  G06N 3/0475 (2023.01)
  G06N 3/094 (2023.01)

(56) References Cited

U.S. PATENT DOCUMENTS

2023/0015253 A1*  1/2023  Nie .......................... G06V 10/82
2023/0153606 A1*  5/2023  Min .......................... G06N 3/08
                                                                706/25
2023/0252692 A1*  8/2023  Liu ........................... G06T 3/18
                                                                345/582

OTHER PUBLICATIONS

Martin Arjovsky et al., "Wasserstein generative adversarial networks", In International conference on machine learning, pp. 214-223, PMLR, 2017.
Andrew Brock et al., "Large scale GAN training for high fidelity natural image synthesis", arXiv preprint arXiv:1809, 11096, pp. 1-35, 2018.
Yunjey Choi et al., "StarGAN: Unified generative adversarial networks for multi-domain image-to-image translation", In Proceedings of the IEEE conference on computer vision and pattern recognition, pp. 8789-8797, 2018.
Anton Cherepkov et al., "Navigating the GAN parameter space for semantic image editing", In Proceedings of the IEEEICVF Conference on Computer Vision and Pattern Recognition, pp. 3671-3680, 2021.
Ian Goodfellow et al., "Generative adversarial nets", Advances in neural information processing systems, pp. 1-9, 27, 2014.
Erik Härkönen et al., "GANSpace: Discovering interpretable GAN controls", atX1v preprint atXiv:2004. 02546, 2020, pp. 1-10.
Yujun Shen et al., "InterFaceGan: Interpreting the disentangled face representation learned by GANs", IEEE transactions on pattern analysis and machine intelligence, XP93093638, vol. 44, No. 4, 2020, pp. 2004-2018.
Yujun Shen et al., "Closed-form factorization of latent semantics in GANs", In Proceedings of the IEEE/CVF Conference on Computer Vision and Pattern Recognition, pp. 1532-1540, 2021.
Andrey Voynov et al., "Unsupervised discovery of interpretable directions in the GAN latent space", In International Conference on Machine Learning, pp. 9786-9796, PMLR, 2020.
Yan Wu et al., "Logan: Latent optimisation for generative adversarial networks", arXiv preprint arXiv:1912.00953, 2019, pp. 1-23.
Zongze Wu et al., "StyleSpace analysis; Disentangled controls for styleGAN image generation", In Proceedings of the IEEE/CVF Conference on Computer Vision and Pattern Recognition, pp. 12863-12872, 2021.
Bolei Zhou et al., "Learning deep features for discriminative localization", In Proceedings of the IEEE conference on computer vision and pattern recognition, pp. 2921-2929, 2016.
International Search Report and Written Opinion issued Nov. 2, 2023, in PCT/EP2023/070911, 20 pages.
Robin Kips et al., "CA-GAN: Weakly Supervised Color Aware GAN for Controllable Makeup Transfer", Arxiv.Org, Cornell University Library, 201 Olin Library Cornell University Ithaca, NY 14853, XP81890729, 16 pages.
Https://www.Youtube.com/@digitalsreeni: "257—Exploring GAN latent space to generate images with desired features?", Feb. 16, 2022, XP093094048, 2 pages Retrieved from the Internet: URL:https://www.youtube.com/watch?v=iuQ_f3W5Ttk [retrieved on Oct. 23, 2023].
Written Opinion and Search Report dated May 3, 2023 in French Application No. 2210849.
Zikun Chen et al. "Exploring Gradient-based Multi-directional Controls in GANS." Sep. 1, 2022. pp. 1-17. XP093043623; URL:https://arxiv.org/pdf/2209.00698.pdf.
Martin Heusel, Hubert Ramsauer, Thomas Unterthiner, Bernhard Nessler, and Sepp Hochreiter. Gans trained by a two time-scale update rule converge to a local nash equi-librium. Advances in neural information processing systems, 30, 2017.
Tero Karras, Samuli Laine, Miika Aittala, Janne Hellsten, Jaakko Lehtinen, and Timo Alla. Analyzing and improving the image quality of stylegan. In Proceedings of the IEEE/CVF Conference on Computer Vision and Pattern Recognition, pp. 8110-8119, 2020.
Tero Karras, Samuli Laine, and Timo Aila. A style-based generator architecture for generative adversarial networks. arXiv preprint arXiv:1812.04948, 2018.
Ziwei Liu, Ping Luo, Xiaogang Wang, and Xiaoou Tang. Deep learning face attributes in the wild. In Proceedings of the IEEE international conference on computer vision, pp. 3730-3738, 2015.
Antoine Plumerault, Hervé Le Borgne, and Céline Hudelot. Controlling generative models with continuous factors of variations. arXiv preprint arXiv:2001.10238, 2020.
Ramprasaath R Selvaraju, Michael Cogswell, Abhishek Das, Ramakrishna Vedantam, Devi Parikh, and Dhruv Batra. Grad-cam: Visual explanations from deep networks via gradient-based localization. In Proceedings of the IEEE international conference on computer vision, pp. 618-626, 2017.
Japanese Office Action dated Sep. 17, 2025, issued in Japanese Patent Application No. 2025-504163 (with English translation).

* cited by examiner

Important dims for
attribute *m* excluded
from gradient for
attribute k

200

206     208     210

202 → smile+

204 → smile+, disentangled from eyeglasses

300

Pseudocode Algorithm 1 - Disentangle attributes

1: Target semantic $k$ is entangled with semantic $m$ in direction $n_z^k$

2: Scoring function $f_m$, threshold $t$

3: $n_z^m = \nabla f_m(z) = \dfrac{\delta f_m(z)}{\delta z}$

4: $E = \{i\}, L_i^m \geq t \ where \ L_i^m = |n_z^m|_i$

5: $n_z^k[i] = 0 \ for \ i \in E$

6: Return $n_z^k$

700

Configuring through conditioning a generative adversarial network (GAN)-based generator and an auxiliary network that finds controllable directions in GAN latent space using gradient information

1002

Providing the generator and the auxiliary network for use by a computing device to generate an image

Providing a generator and an auxiliary network sharing a latent space where the generator generates synthesized images exhibiting human-interpretable semantic attributes and the the auxiliary network classifies semantic attributes, the auxiliary network including a semantic attribute classifier for each semantic attribute to be controlled, each semantic attribute classifier providinge a meaningful direction for controlling the one of the semantic attributes in the synthesized images of the generator

1102

When invoking the generator to generate the synthesized image from the source image,applying a respective semantic attribute control to control a respective semantic attribute in a synthesized image generated from a source image. The respective semantic attribute control is responsive to the meaningful direction provided by the classifier associated with the semantic attribute

METHODS AND APPARATUS FOR DETERMINING AND USING CONTROLLABLE DIRECTIONS OF GAN SPACE

CROSS-REFERENCE TO RELATED APPLICATION

This application claims a benefit of U.S. Provisional Application No. 63/392,905 filed Jul. 28, 2022, the entire contents of which are incorporated herein by reference. This application claims priority to French Patent Application No. FR 2210849 filed Oct. 20, 2022, the entire contents of which are incorporated herein by reference.

FIELD

This disclosure relates to image process using artificial intelligence and deep neural networks including generative adversarial networks (GANs) such as for creating an augmented reality. More particularly, this disclosure relates to methods and apparatus for determining and using controllable directions of GAN Space.

BACKGROUND

GANs have been successfully applied to tackle varied tasks such as simulating makeup effects on human faces, or changing hair colors to provide realistic Augmented Reality (AR) technology in the beauty industry. Nevertheless, conditional generative models that offer controls over output semantics usually require large amounts of labelled training data, which could be expensive and time-consuming to obtain. Moreover, artifacts and attribute entanglements sometimes appear in the current face-editing outputs, which may lead to a reduced overall user experience.

It is desired to obtain controls over native GAN output semantics, with a view to improving user experience by removing artifacts or disentangling attributes when editing human faces and generating large amounts of synthetic labelled data for training conditional models.

SUMMARY

Methods, apparatus and techniques herein relates to determining directions in GAN latent space and obtaining disentangled controls over GAN output semantics, for example, to enable use of such to generating synthesized images such as for use to train another model or create an augmented reality. The methods, apparatus and techniques herein, in accordance with embodiments, utilize the gradient directions of auxiliary networks to control semantics in GAN latent codes. It is shown that minimal amounts of labelled data with sizes as small as 60 samples can be used, which data can be obtained quickly with human supervision. It is also shown herein, in accordance with embodiments, to select important latent code channels with masks during manipulation, resulting in more disentangled controls. Various aspects are shown and described herein as set forth in the following statements in accordance with embodiments. These and other aspects will be apparent to a person of ordinary skill in the art having considered the present application as a whole.

Statement 1: There is provided a computing device comprising: a processor and a storage device, the storage device storing instructions which, when executed by the processor, cause the computing device to: provide a generator and an auxiliary network sharing a latent space, the generator configured to generate synthesized images exhibiting human-interpretable semantic attributes and the auxiliary network comprising a plurality of semantic attribute classifiers including a semantic attribute classifier for each semantic attribute to be controlled for generating a synthesized image from a source image, each semantic attribute classifier configured to classify a presence of one of the semantic attributes in images and provide a meaningful direction for controlling the one of the semantic attributes in the synthesized images of the generator; and generate the synthesized image from the source image using the generator by applying a respective semantic attribute control to control a respective semantic attribute in the synthesized image, the respective semantic attribute control responsive to the meaningful direction provided by the classifier associated with the semantic attribute.

Statement 2: The computing device of Statement 1, wherein the meaningful direction comprises a gradient direction, and the instructions cause the computing device to compute a respective semantic attribute control from a respective gradient direction of the classifier associated with the semantic attribute.

Statement 3: The computing device of Statement 2, wherein to control two or more semantic attributes, the instructions cause the computing device to combine each respective gradient direction of each classifier associated with the two or more semantic attributes to be controlled.

Statement 4: The computing device of Statement 1 or 2, wherein the instructions cause the computing device to disentangle the respective semantic attribute control for applying to the generator.

Statement 5: The computing device of Statement 4, wherein: each respective semantic attribute control comprises a respective gradient direction vector computed from parameters of the respective semantic attribute classifier associated with the respective semantic attribute control; and to disentangle one respective semantic attribute control from another respective semantic attribute control comprises removing important data dimensions of the gradient direction vector associated with the one respective semantic attribute control from the gradient direction vector associated with the other respective semantic attribute control.

Statement 6: The computing device of Statement 5, wherein the important data dimensions removed are in response to a threshold identifying those data dimensions having an absolute value that is greater or equal to the threshold.

Statement 7: The computing device of Statement 6, wherein, if the i-th data dimension for the gradient direction vector associated with the one respective semantic attribute control is identified by the threshold, the corresponding i-th data dimension for the gradient direction vector associated with the other respective semantic attribute control is set to zero.

Statement 8: The computing device of any one of Statements 1 to 7, wherein the instructions cause the computing device to receive an input identifying at least one of the respective semantic attributes to be controlled relative to the source image.

Statement 9: The computing device of Statement 8, wherein the input identifying at least one of the respective semantic attributes comprises a granular input to determine an amount of the semantic attribute to be applied when generating the synthesized image.

Statement 10: The computing device of any one of Statements 1 to 9, wherein the instructions cause the computing device to any one or more of: provide the generator and the auxiliary network to generate the synthesized images as a service; provide an e-commerce interface to purchase a product or service; provide a recommendation interface to recommend a product or service; and provide an augmented reality interface using the synthesized image to provide an augmented reality experience.

Statement 11: The computing device of any one of Statements 1 to 10, wherein a particular semantic attribute of the plurality of semantic attributes comprises one of: a facial feature comprising age, gender, smile, or other facial feature; a pose effect; a makeup effect; a hair effect; a nail effect; a cosmetic surgery or dental effect comprising one of a rhinoplasty, a lift, blepharoplasty, an implant, otoplasty, teeth whitening, teeth straightening or other cosmetic surgery or dental effect; or an appliance effect comprising one of an eye appliance, a mouth appliance, an ear appliance or other appliance effect.

Statement 12: The computing device of any one of Statements 1 to 11, wherein the generator is a GAN-based generator and each classifier is a neural network based binary classifier, the generator and each neural network based binary classifier co-trained with training images exhibiting label semantic attributes to define the meaningful directions in respective classifiers.

Statement 13: There is provided a method comprising: training a controllable a generative adversarial network-based (GAN-based) generator g to generate a synthesized image from a source image in which at least one semantic attribute of a defined set of semantic attributes is selectively controlled, wherein the generator comprises a model that maps a latent code (z) in its latent space (Z) to an image (x=g(z)) in an image space (X) where human-interpretable semantics are present, the training comprising: co-training the generator y and an auxiliary network comprising a respective classifier for each semantic attribute of the defined set, each respective classifier providing a meaningful data direction for use to control the respective semantic attribute when generating the updated image: and providing the generator g and the auxiliary network for generating synthesized images.

Statement 14: The method of statement 13 comprising invoking the generator g using at least one control computed from parameters of the auxiliary network providing the meaningful data direction for each of the at least one control to generate a plurality of synthesized images having selected semantic attributes from the defined set.

Statement 15: The method of Statements 13 or 14 comprising training a further network model using at least some of the plurality of synthesized images.

Statement 16: A method comprising: generating a synthesized image (g(z')) using a generator (g) having a latent code (z) which manipulates a target semantic attribute (k) in the synthesized image comprising: discovering a meaningful direction at z for the target semantic attribute k, the meaningful direction identified from an auxiliary network classifying respective semantic attributes at z, including target semantic attribute k; defining z' by z optimizing responsive to the meaningful direction for the target semantic attribute k; and outputting the synthesized image.

Statement 17: The method of Statement 16, wherein the auxiliary network comprises a set of binary classifiers, one for each semantic attribute that the generator Is capable to manipulate, the auxiliary network co-trained to share a latent code space Z with generator g.

Statement 18: The method of Statements 16 or 17, wherein the respective semantically meaningful data directions comprise a respective dimensional data vector obtained from each individual classifier, each vector comprising a direction and rate of the fastest increase in the individual classifier.

Statement 19: The method of any one of Statements 16 to 18 comprising: disentangling data directions by filtering out from dimensions of a semantically meaningful data direction of the target semantic attribute those important dimensions of respective semantically meaningful data directions of each other semantic attribute (m, m≠k) entangled with the target semantic attribute; wherein a particular dimension is important based on its absolute gradient magnitude.

Statement 20: The method of Statement 19, wherein filtering comprises evaluating each dimension of each semantically meaningful data direction to be disentangled from the target semantically meaningful data direction; if a particular dimension exceeds a threshold value, setting a value of the corresponding dimension in the target semantically meaningful data direction to a zero value.

Statement 21: The method of Statement 20, wherein latent code z is optimized as:

$$z' = z + \alpha n_z^{k'},$$

wherein:

$$n_z^k$$

is a vector representing the target semantically meaningful data direction before filtering;

$$n_z^{k'}$$

is a vector representing the target semantically meaningful data direction after filtering; and α is a hyperparameter that controls the interpolation direction and step size.

Statement 22: The method of any one of Statements 16 to 21, comprising repeating operations of discovering, defining and optimizing in respect of latent code z' to further manipulate sematic attribute k.

Statement 23: The method of any one of Statements 16 to 22 comprising generating a synthesized image to manipulate a plurality of target semantic attributes, discovering respective meaningful directions at z for each of the target semantic attributes as identified from the auxiliary network classifying each of the target semantic attributes at z, and optimizing z in response to each of the meaningful directions.

Statement 24: The method of any one of Statements 16 to 23 comprising training another network model using the synthesized image.

Statement 25: The method of any one of Statements 16 to 24, comprising receive an input identifying the target semantic attribute to be controlled relative to a source image.

Statement 26: The method of Statement 25, wherein the input comprises a granular input to determine an amount of the target semantic attribute to be applied when generating the synthesized image.

Statement 27: The method of any one of Statements 16 to 26 comprising any one or more of:

providing the generator and the auxiliary network to generate the synthesized images as a service; providing an e-commerce interface to purchase a product or service; providing a recommendation interface to recommend a product or service; and providing an augmented reality interface using the synthesized image to provide an augmented reality experience.

Statement 28: The method of any one of Statements 16 to 27, wherein the target semantic attribute comprises one of: a facial feature comprising age, gender, smile, or other facial feature: a pose effect; a makeup effect; a hair effect; a nail effect: a cosmetic surgery or dental effect comprising one of a rhinoplasty, a lift, blepharoplasty, an implant, otoplasty, teeth whitening, teeth straightening or other cosmetic surgery or dental effect; and an appliance effect comprising one of an eye appliance, a mouth appliance, an ear appliance or other appliance effect.

Statement 29: A method comprising the steps of: providing an augmented reality (AR) interface to provide an AR experience, the AR interface configured to generate a synthesized image from a received image using a generator by applying a respective semantic attribute control to control a respective semantic attribute in the synthesized image, the respective semantic attribute control responsive to a meaningful direction provided by a classifier associated with the semantic attribute; and receiving the received image and providing the synthesized image for the AR experience.

Statement 30: The method of Statement 29 comprising processing the synthesized image using an effects pipeline to simulate an effect and providing the synthesized image with the simulated effect for presenting in the AR interface. The method of Statements 29 or 30 can be combined with any of the features (adapted as may be applicable) of Statements 1 to 13 or 16 to 28, for example.

Statement 31: A computing device comprising at least one processor and at least one non-transitory storage device storing computer readable instructions for execution by the at least one processor, which instructions cause the computing device to perform a method of any one of Statements 13 to 30.

Statement 32: A computer program product comprising at least one non-transitory storage device storing computer readable instructions for execution by at least one processor of a computing device, wherein execution of the instructions cause the computing device to perform a method of any one of Statements 13 to 30.

BRIEF DESCRIPTION OF THE DRAWINGS

FIG. 1A is a graphical representation of a computing device providing a convolutional neural network (CNN) in accordance with an embodiment. FIG. 1B is a graphical representation of dimensions of respective gradients for semantic attributes k and m, in accordance with an embodiment. FIG. 1C is flowchart of operations of a one-step optimization, in accordance with an embodiment.

FIGS. 10 and 11 are flowcharts showing operations, in accordance with respective embodiments herein.

Figure 1A:
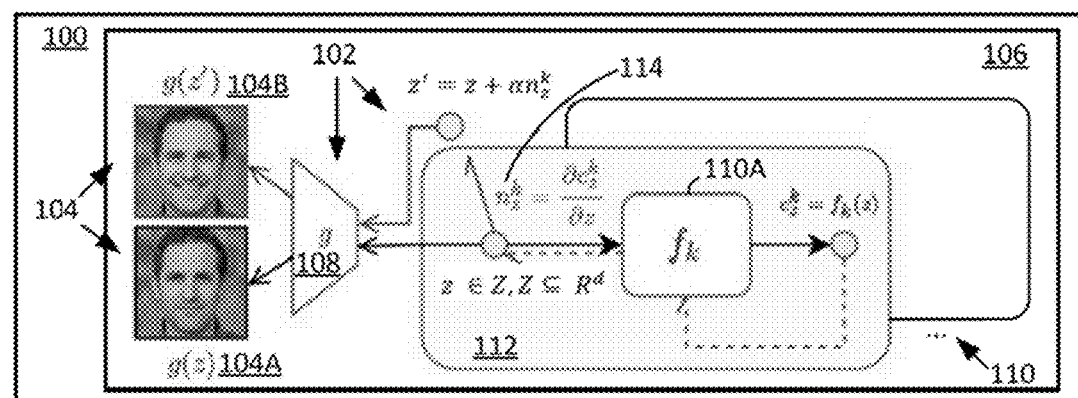
FIGS. 1A, 1B and 1C illustrate an overview of training-and/or architecture-related aspects disclosed herein, in accordance with respective embodiments.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and, not merely the embodiments themselves. It is to be understood further that the general inventive concept is not limited to the illustrative embodiments described below and the following descriptions should be read in such light.

DETAILED DESCRIPTION

Although GAN models are capable of generating highly realistic images given random inputs from their latent space, the generation process is typically a black-box, hence the lack of direct control over output semantics. Nevertheless, previous works [VB20, VB20, SZ21, HHLP20, SYTZ20] have shown that meaningful directions and channels exist in GAN latent space, and linearly interpolating in these directions or changing individual channel values result in interpretable transformations, e.g., adding eyeglasses or smile to a person's face. An objective of the methods, apparatus and techniques herein relates to determining (e.g. learning) directions in GAN latent space and obtaining disentangled controls over GAN output semantics, for example, to enable use of such learned directions for creating augmented realities, generating synthesized images for training a model, etc. A focus herein is on the human face editing task, useful in the beauty industry as well as others. To this end, the methods, apparatus and techniques herein, in accordance with embodiments, utilize the gradient directions of auxiliary networks to control semantics in GAN latent codes. It is shown that minimal amounts of labelled data with sizes as small as 60 samples can be used, which data can be obtained quickly with human supervision. It is also shown herein, in accordance with embodiments, to select important latent code channels with Grad-CAM based masks during manipulation, resulting in more disentangled controls. The following section reviews previous works in relevant areas to contextualize the teachings herein.

Generative adversarial networks (GANs), introduced by [GPAM+ 14], currently dominate the generative modelling field with its strong capability to synthesize photo-realistic images. In general, GANs consist of two networks, including a generator that learns a mapping from its latent space to the image space, and a discriminator that distinguishes GAN-synthesized images from the real ones, and the two networks are trained jointly in an adversarial manner. Different variants of GANs have been proposed to improve the output fidelity and training stability [ACB17, BDS18, CCK+ 18, KLA18, KLA+20], and there's been increasing research interest in studying the latent space of these native GAN models, which offers more control over the generation process.

Latent semantic manipulation for GANs have been studied by multiple previous works [VB20 VB20, SZ21 HHLP20, SYTZ20 PBH20], and it's been shown that meaningful directions and channels exist in GAN latent space/feature space. One line of works discover controls over output semantics for unconditional GANs with explicit supervision [SYTZ20, WLS21]. For instance, interFaceGAN [SYTZ20] assumes that for any binary semantic (e.g., male vs. female), there exists a hyperplane serving as a separation boundary in the latent space, and its normal vector represents the meaningful direction. Employing classifiers pretrained on the CelebA dataset [LLWT15] to generate pseudo-labels of GAN-synthesized images, the separation boundaries are thereafter learned using state vector machines (SVMs) trained on paired data with GAN latent codes and the corresponding semantic labels. [WLS21] discovers channels that control localized effects in GAN activation space with guidance from pretrained semantic segmentation networks. However, the range of controls found by these supervised methods is usually limited, as they require large amounts of labelled data or pretrained neural networks, and the controls learned are sometimes entangled.

Another line of works discovers such controls in a self-supervised or unsupervised manner [HHLP20, CVB21, VB20]. For example, GANSpace [HHLP20] identifies important latent directions through applying principal component analysis (PCA) to vectors in GAN latent space or feature space, and [VB20] discovers interpretable directions in the GAN latent space by jointly optimizing the directions and a reconstructor that recovers these directions and manipulation strengths from images generated based on the manipulated GAN latent codes. Although these methods do not require labelled data, they usually involve extensive manual examinations of different manipulation directions and identification of meaningful controls. More importantly, and distinguished from the techniques, etc. taught in accordance with embodiments herein, control over a target semantic is not always guaranteed.

Gradient-based knowledge has been leveraged to improve interpretability [ZKL+ 16, SCD+ 17] or training stability [WDB+ 19] of neural networks. For instance, [SCD+ 17] utilizes gradient information from the classification outputs to obtain localization maps that visual evidence in images. [WDB+ 19] proposes to increase the stability of training dynamics of GANs by adding an extra step before optimizing the generator and discriminator jointly, at which the latent code is first optimized towards to regions regarded as more real by the discriminator, and the direction is obtained through calculating the gradient with respect to the latent codes.

In contrast to [WDB+ 19] and in accordance with embodiments herein, previously unseen in the literature, auxiliary binary classifier gradients are utilized to obtain controls over GAN output semantics. Thus in accordance with embodiments, methods, apparatus and techniques herein are described that obtain disentangled controls in the GAN latent space, which first find semantically meaningful directions by calculating gradients of binary classifiers that score different semantics given latent code inputs, and then select important dimensions in the latent code for attribute disentanglement during manipulation.

Determining Semantically Meaningful Directions

FIG. 1A is a graphical representation of a computing device 100, in accordance with an embodiment, including CNN architecture 102 and image output (e.g. images 104 comprising 104A and 104B) such as stored in a storage device 106 of device 100. FIG. 16 is a graphical representation of a portion of storage device 106 storing dimensions of respective gradients 132 and 130 for semantic attributes k and m, in accordance with an embodiment. The graphic illustrates disentanglement of dimensions of a gradient for attribute m from the corresponding dimensions of a gradient for attribute k. FIG. 1C is flowchart of operations 150 of a one-step optimization, in accordance with an embodiment, and as described further herein below.

CNN architecture 102 comprises a controllable GAN g 108 configured to generate output images g(z) 104A and g(z') 104B from respective latent codes z and z' (e.g. respective portions of latent space Z of GAN g 108). Images g(z) 104A and g(z') 104B show a facial image presenting different semantic attributes. In the example shown, the face of the individual in image g(z) 104A is without a smile while the face of the same individual in image g(z') 104B is with a smile.

CNN architecture 102 further comprises a plurality of respective auxiliary networks 110, one for each semantic attribute to be controlled by GAN g 108. The plurality of auxiliary networks 110 each comprise respective mapping functions $f$, which auxiliary networks 110 are trained along with GAN g 108 to discover meaningful directions for each semantic attribute to be controlled. In an embodiment, mapping functions $f$ comprise binary classifiers. FIG. 1A only shows details in box 112 related to one of the respective classifiers from auxiliary network 110 for simplicity, namely mapping function $f_k$ 110A for semantic attribute k. In FIG. 1A, each of GAN g 108 and the auxiliary networks 110 are previously trained with training images for each of the semantic attributes (e.g. 60 images per semantic attribute). As shown in box 112, to manipulate a semantic attribute k, e.g., a smile, for a GAN latent code z, gradient direction $$n_z^k$$

114 from the mapping function $f_k$ that maps GAN latent codes (e.g. z) to semantic scores for k is used as input to derive a modified z (i.e. z') for GAN g 108. The equation to derive the modified z is described further below.

Figure 1B:
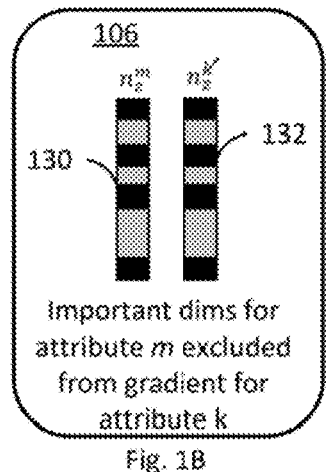
Figure 1C:
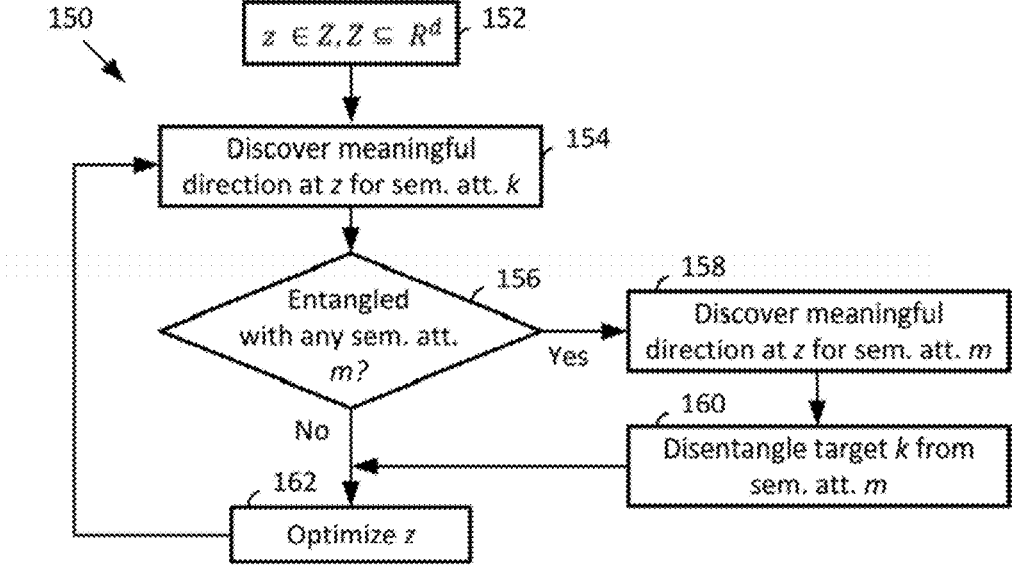

Reference is next directed to FIG. 1B. In accordance with an embodiment, semantic attributes are disentangled. Important dimensions for manipulating semantic attribute m are removed in respect of attribute k. In accordance with an embodiment, the important dimensions are those with large gradient magnitudes in $$n_z^m$$

130 for semantic attribute m. Such dimensions are masked (e.g. set or defined) to a 0 value in gradient direction $$n_z^k$$

112 for semantic attribute k, where gradient direction $$n_z^{k'}$$

132 denotes the gradient direction $$n_z^k$$

112 after masking (e.g. after setting important attributes to zero). Dimension masking is described further below, particularly in respect of what is a large gradient magnitude.

Reference is next directed to FIG. 1C where operations 150 show a pipeline for one-step optimization. Operations begin at 152 with latent codes z, such as for facial images. At 154, meaningful directions at z for semantic attribute k are discovered (e.g. the gradient is computed from the parameters of the trained respective mapping function $f_k$). A decision at 156 evaluates whether there is entanglement with any semantic m (where m represents a different semantic attribute than k to be controlled by GAN g). If so, via "Yes" branch to 158, meaningful directions at z for semantic attribute m are discovered (e.g. computed from the parameters of the trained respective mapping function $f_m$). At 160, operations perform disentanglement, such as described with reference to FIG. 1B as well as further herein below. In an embodiment, determining entanglement such as at 156 was identified via experiment Entanglement was observed by editing each attribute using a small meta-validation set of 30 images following the original gradient direction of k, then deciding which attributes are entangled. An association between the target attribute and any entangled attributes was tabulated. Important attributes from each of the identified attributes (i.e. those m≠k) are masked out. In an embodiment, a union of top channels (e.g., the 100 greatest gradient magnitudes) for attributes to be disentangled is determined. Then those dimensions are to 0 in the target direction (e.g. to produce $$n_z^{k'}).$$

In an embodiment, for example, without previous observational experimentation, directly masking out the i-th dimension value in gradient $$n_z^k$$

in response to a magnitude of the i-th dimension value in gradient $$n_z^m$$

can be performed. In the first case, when there's entanglement, masking out those dimensions helps disentanglement;

in the second case, there's no entanglement, and the important dimensions for m are insignificant in k, so masking them out doesn't significantly change the direction.

At 162, operations optimize latent codes z. Operations may repeat (e.g. looping to step 154) with the next instance of latent codes z until desired manipulation result is achieved. Referring again to step 156, in an embodiment, if there is no respective entanglement, operations proceed via "No" branch to step 162 to perform optimization of latent codes z. As noted, in an embodiment, operations may mask out important dimensions of any other attribute even if there is no entanglement. For example, rather than determining which m attributes are entangled and then disentangling the important dimensions from the gradient for k, it may be simpler (e.g. programmatically) to just disentangle the important dimensions from all m≠k.

Figures 2, 3:
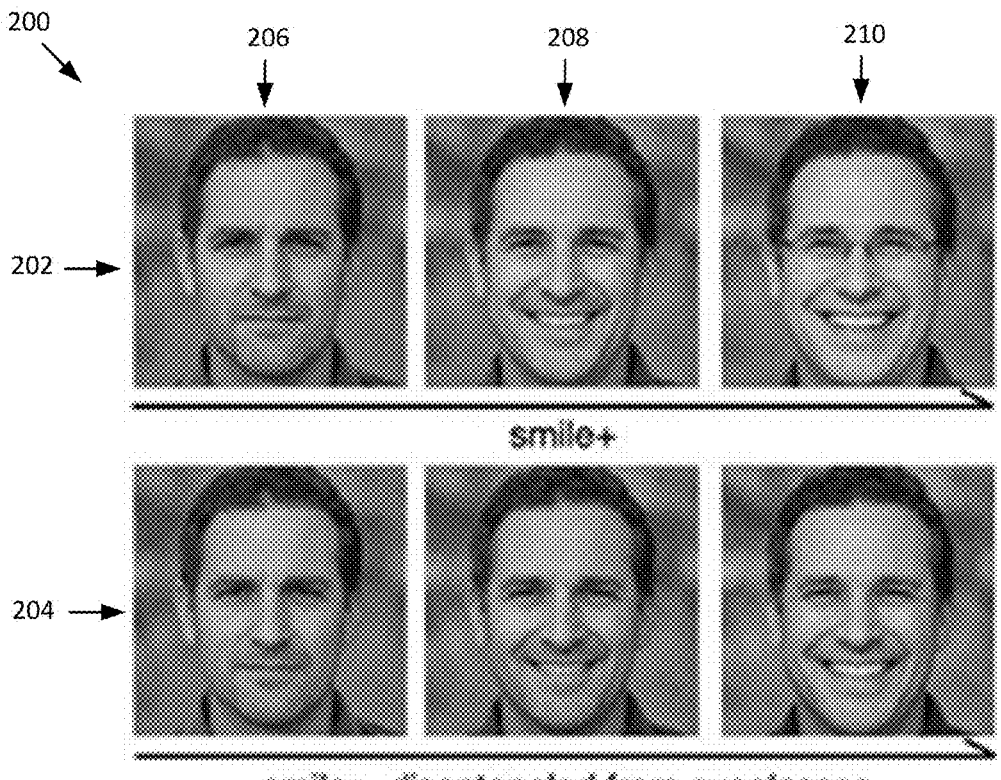
FIG. 2 is a table of images to illustrated disentanglement of semantic attributes, namely, smile from eyeglasses, in facial images in accordance with an embodiment.
FIG. 3 is a pseudocode listing operations, in accordance with an embodiment.

FIG. 2 is a table 200 of images include table rows 202 and 204, to illustrate disentanglement of smile from eyeglasses. The first (left) column 206 in both rows 202 and 204 are the original images. The second (middle) third (right) columns 208 and 210 are edited with smaller, and larger interpolation distances. The difference is that, in the second row when the distance is larger (i.e. more smile added relative to the column 208), no eyeglasses are added. That is, the second row applies disentanglement. Thus row 202 shows respective facial images of a same subject in each image, From left to right, the subject has: i) no smile and no glasses, ii) a smile and no glasses, and iii) a smile and glasses. In row 204, images show the same subject as shown in row 202. The images of row 204 show the application of disentanglement that is not applied in row 202. From left to right, the subject has: i) no smile and no glasses, ii) a smile and no glasses, and iii) a smile and no glasses.

During one-step optimization operations, as discussed with reference to FIGS. 1B and 1C important dimensions in the gradient from $f_{eyeglasses}$ are masked to 0 in $$n_z^{smile}.$$

The nomenclature $$\left| n_z^k \right|_i$$

denotes the absolute value of the gradient vector at dimension i. Contrary to the original multiclass classification setting for Grad-CAM, where ReLU is chosen as the activation, here the absolute value is used, as in the binary classification setting. Dimensions with negative influence on the semantic score also contain meaningful information.

In more detail, in accordance with an embodiment, there is provided a method for determining (e.g. learning) meaningful directions in GAN latent space to manipulate semantics in GAN outputs. A well-trained GAN model learns a mapping g that maps a d-dimensional latent code z (in the GAN's latent space Z (e.g. z∈Z, Z⊆$R^d$), to an image x=g(z) in the image space X. Human-interpretable semantics exist in the image space X and include, for example, age, gender, eyeglasses, smile, head pose of a person, or other semantic observation. Given a series of scoring functions $s_1 \ldots s_k$ for K semantics, K mappings are obtained from the latent space Z to the semantic spaces $C_1 \ldots C_k$⊆R respectively, where:

$$c_z^k = s_k(g(z)),\, c_z^k \in C_k, \tag{1}$$

and where $$c_z^k$$

denotes the kth semantic score in the image generated based on the latent code z. In an embodiment, each of the semantics are separate. For example, rather than an attribute "smile with teeth", there attributes are separated for "smile" and "teeth". Control on multiple semantics simultaneously (smile with teeth) can be obtained by combining control for smile and teeth (adding up direction vectors).

Provided the accuracy and independence of $s_1 \ldots s_k$, it's expected that when the kth semantic attribute in the output image changes, its score $$c_z^k$$

changes accordingly, yet other semantic scores remain approximately the same. It is hypothesized that useful information is embedded in the mappings from GAN latent spaces to semantic spaces, which can be leveraged to find semantically meaningful directions. In particular, to control $$c_z^k,$$

it is proposed to interpolate the latent code following the gradient direction of such mapping function. For computation simplicity, each mapping function $s_k\,(g(z))$ is parameterized, with a neural network $f_k$ trained on paired samples of GAN latent codes and corresponding semantic labels, generated by the original $s_k(g(z))$ (e.g. the ground truth scoring function/human perception). The direction is calculated following:

$$n_z^k = \nabla f_k(z) = \frac{\partial f_k(z)}{\partial z}, \tag{2}$$

where the vector $$n_z^k$$

denotes the direction and rate of fastest increase in $$c_z^k$$

The latent optimization technique (in accordance with embodiments), used during training to optimize the latent code, follows a hypothesis that the gradient from a GAN discriminator D points in the direction that indicates better sample. A GAN discriminator can be seen as a scoring function for "realness" This insight is extended to multiple (e.g. K) semantics. Intuitively, for each target semantic, interpolating the latent code following the gradient from the respective semantic attribute's scoring function changes the semantic score, and the semantic attribute is manipulated accordingly. To manipulate semantic attribute k once, z is updated with:

$$z' = z + an_z^k \tag{3}$$

where $\alpha$ is a hyperparameter that controls the interpolation direction and step size. Note that in contrast to previous works [SYTZ20, HHLP20], which discovered linear semantically meaningful directions applicable to all data points in GAN latent space, the present method and/or technique finds unique directions for each data point: as z changes, $$n_z^k$$

changes simultaneously due to the nonlinear nature of equation 1, and a new direction is calculated for the updated z at each step of optimization.

Disentanglement of Attributes During Manipulation

There is provided a method and/or technique, in accordance with an embodiment, to minimize semantic attribute entanglements. Attribute entanglements can (e.g. sometimes) emerge during latent code interpolation following the directions found as described above. As used herein and as will be appreciated to a person of ordinary skill in the art, two or more semantic attributes are entangled when, during interpolation, manipulation of one semantic attribute affects the other or others of the two or more attributes. It is observed that interpolation along the original directions may alter non-target semantics, but such effects can occasionally be removed by randomly excluding dimensions in the direction vector used for interpolation. Therefore, it is hypothesized that within the d-dimensional direction vector discovered, only some dimensions are responsible for the change in the target semantic attribute, yet the other dimensions denote bias learned from the training data. For example, in the direction that increases a person's age, eyeglasses appear during manipulation as eyeglasses and age are correlated in the data.

Grad-CAM [SCD+ 17], is a class-discriminative localization technique that provides visual explanations for CNN-based models using gradient information. In accordance with a method and/or technique herein, dimensions are filtered out based on gradient magnitudes from the semantic scoring function. This results in more disentangled controls. In particular, Grad-CAM measures the importance of neurons by:

$$a_k^c = \frac{1}{Z}\sum_i \sum_j \frac{\partial y^c}{\partial A_{i,j}^K}, \tag{4}$$

where the gradient of the score $y^c$ for class c with respect to the activation map A at all width and height dimensions are global-average-pooled. The final heatmap is obtained by calculating:

$$L_{Grad-CAM}^c = ReLU\left(\sum_k a_c^k A^K\right). \tag{5}$$

In accordance with an embodiment, $n_z^k$ is regarded as the only activation map, and the importance of the ith dimension is calculated by $$L_i^k = |n_z^k|_i \qquad (6)$$

By definition of gradients, the value of $$n_z^k$$

at its ith dimension indicates the rate of change in $$c_z^k$$

induced by a small change in z at the same dimension. Intuitively, dimensions in $$n_z^k$$

with greater $$L_i^k$$

have more influence on $$c_z^k,$$

and those with smaller ones are less relevant. However, such irrelevant dimensions could have high gradient magnitudes when calculating control for another semantic attribute $$n_z^m,$$

Hence, even a small amount of change in these dimensions while optimizing for the kth semantic could potentially affect $$c_z^m,$$

resulting in the attribute entanglement issue. Therefore, in accordance with an embodiment, dimensions in the gradient for any kth semantic attribute with $$L_i^k$$

no less than a certain threshold are regarded as important, while any important dimensions in predicting the semantic attribute that appear to be coupled with the target from the target direction are excluded. In an embodiment, even important dimensions for k can be masked out if k is entangled with m and they share important dimensions.

FIG. 3 describes operations 300, in a form of pseudocode, to calculate the new direction with attributes disentangled in accordance with an embodiment. At Line 1 it is noted that the target semantic is entangled with another in direction $$n_z^k.$$

At Line 2 it is noted that the scoring function $f_m$, for the entangle semantic m and a threshold of t is established to identify important gradients (i.e. large gradient magnitudes). At Line 3 the gradient $$\left(n_z^k\right)$$

of the entangled semantic m is determined from its respective function. At Line 4, each of the i dimensional elements $$L_i^m$$

are examined relative to t, where the elements $$L_i^m = |n_z^m|_i.$$

At Line 5 or gradients that are identified by the threshold, corresponding gradient magnitudes in dimensions for k are set to 0:

$$n_z^k[i] = 0$$

for $i \in E$, and a final form of $$n_z^k$$

is returned (e.g. provided) at Line 6.

At each step, to increase the semantic score $$c_z^k$$

once with the mth semantic disentangled, is updated with:

$$z' = z + \alpha n_z^{k'} \qquad (7)$$

with $$n_z^{k'}$$

calculated following the operations 300 of the pseudocode algorithm of FIG. 3. It will be understood that operations may loop and repeat such that z' is computed more than once to further interpolate along the direction of the target semantic attribute, for example, until an image (e.g. g(z') 104B) having the desired characteristics is produced.

Embodiment Details

In accordance with an embodiment, the GAN portion of network architecture structure 102 (e.g. GAN g 108) adapts the structure of StyleGAN2 (KLA+20), for example as pre-trained on the FFHQ dataset [KLA18]. Optimization is performed in the W space of StyleGAN2 [KLA+20]. 400 images were generated with StyleGAN2, from which 30 images were manually selected as positive/negative samples for each target semantic, and 10% of the pairs selected were used for evaluation. Multiple binary classifiers (e.g. respective instances of 110) were trained for different target semantics simultaneously in a multi-label learning manner, minimizing the sum of all binary cross-entropy losses. In accordance with an embodiment, each classifier (e.g. $f_k$) comprises two fully connected layers, with a hidden layer size equal to 16, a ReLU activation, and a Sigmoid activation at its output neuron. For the filtering threshold t, it was determined such as via experiment that the 100th greatest gradient magnitude from channels of $$n_z^m$$

works well in practice. For the $\alpha$ value, 0.4 was used in all experiments.

Figure 4:
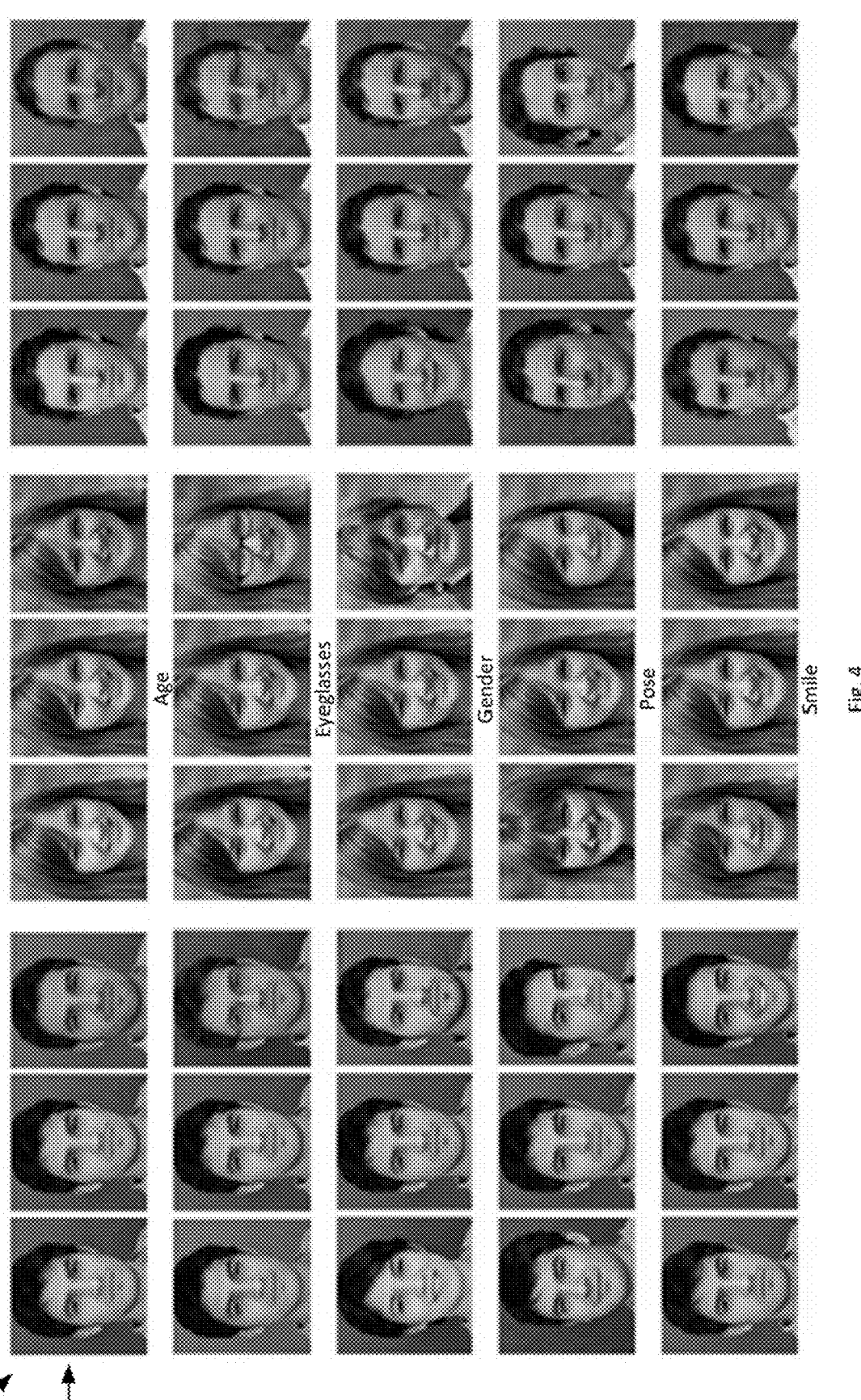
FIG. 4 is a table of images to illustrate semantic attribute manipulation results using a controllable neural network, in accordance with an embodiment.
Figure 5:
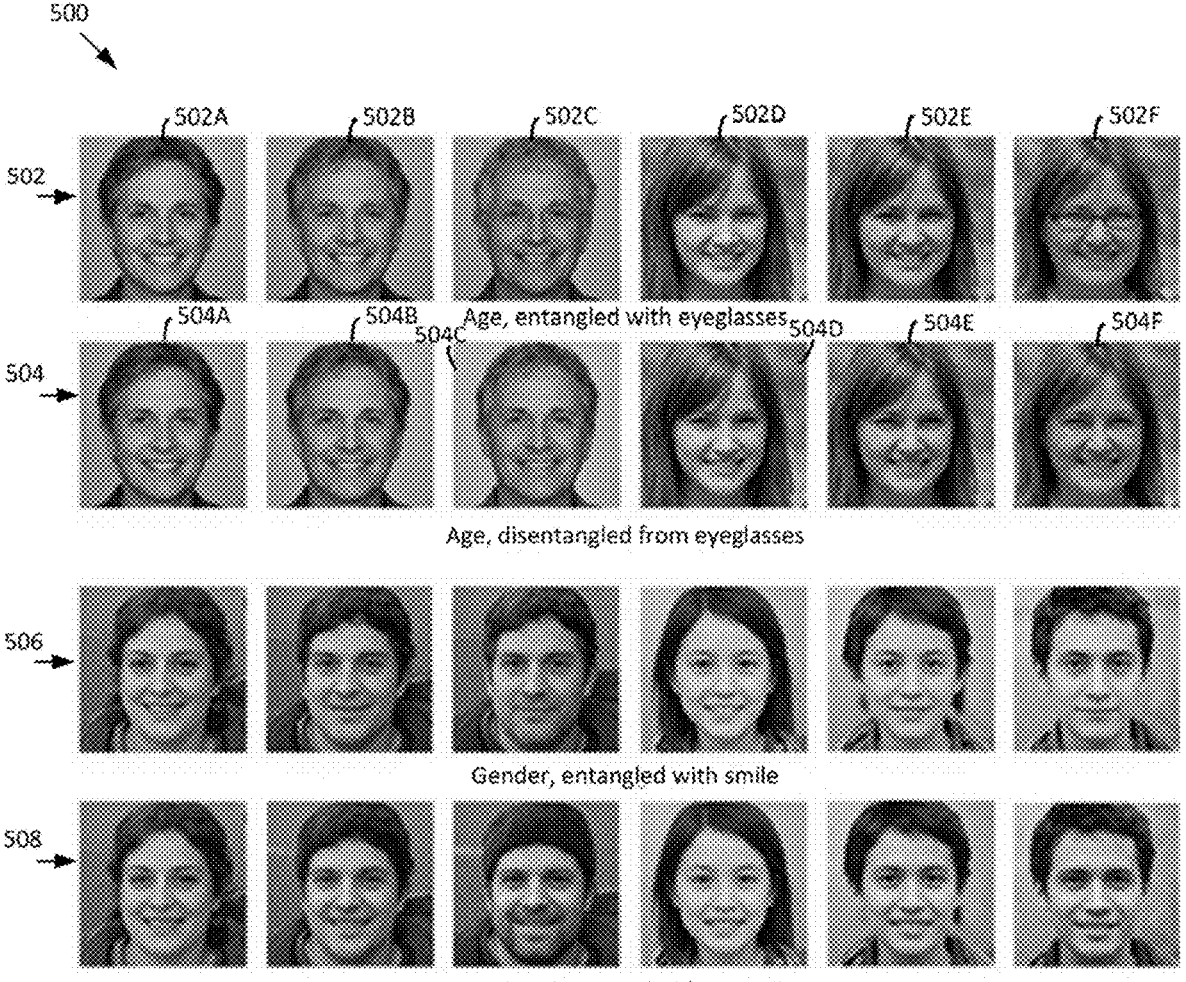
FIG. 5 is a table of images to illustrate semantic attribute disentanglement results using a controllable neural network, in accordance with an embodiment.
Figure 6:
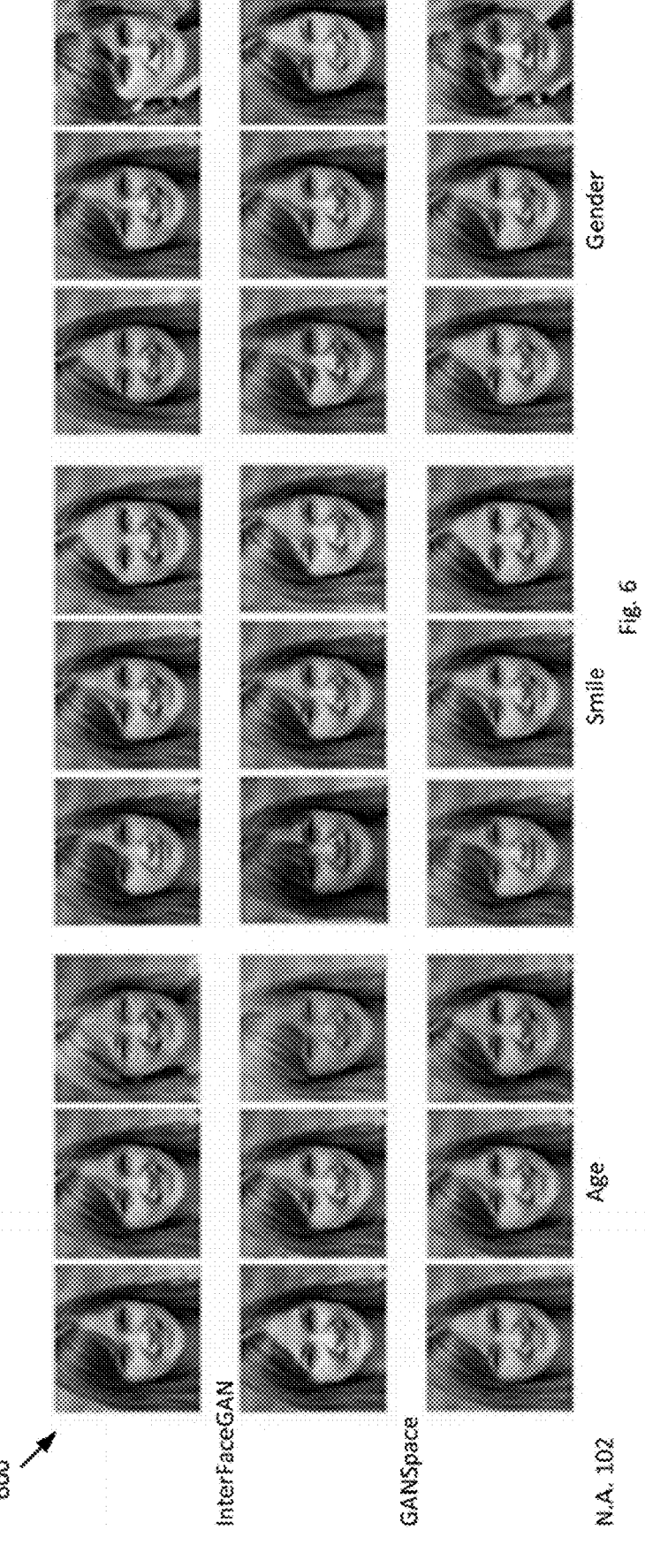
FIG. 6 is a table of images visualizing directions found to compare three controllable neural networks, namely two previously known controllable neural networks and a controllable neural network in accordance with an embodiment herein.
Figure 7:
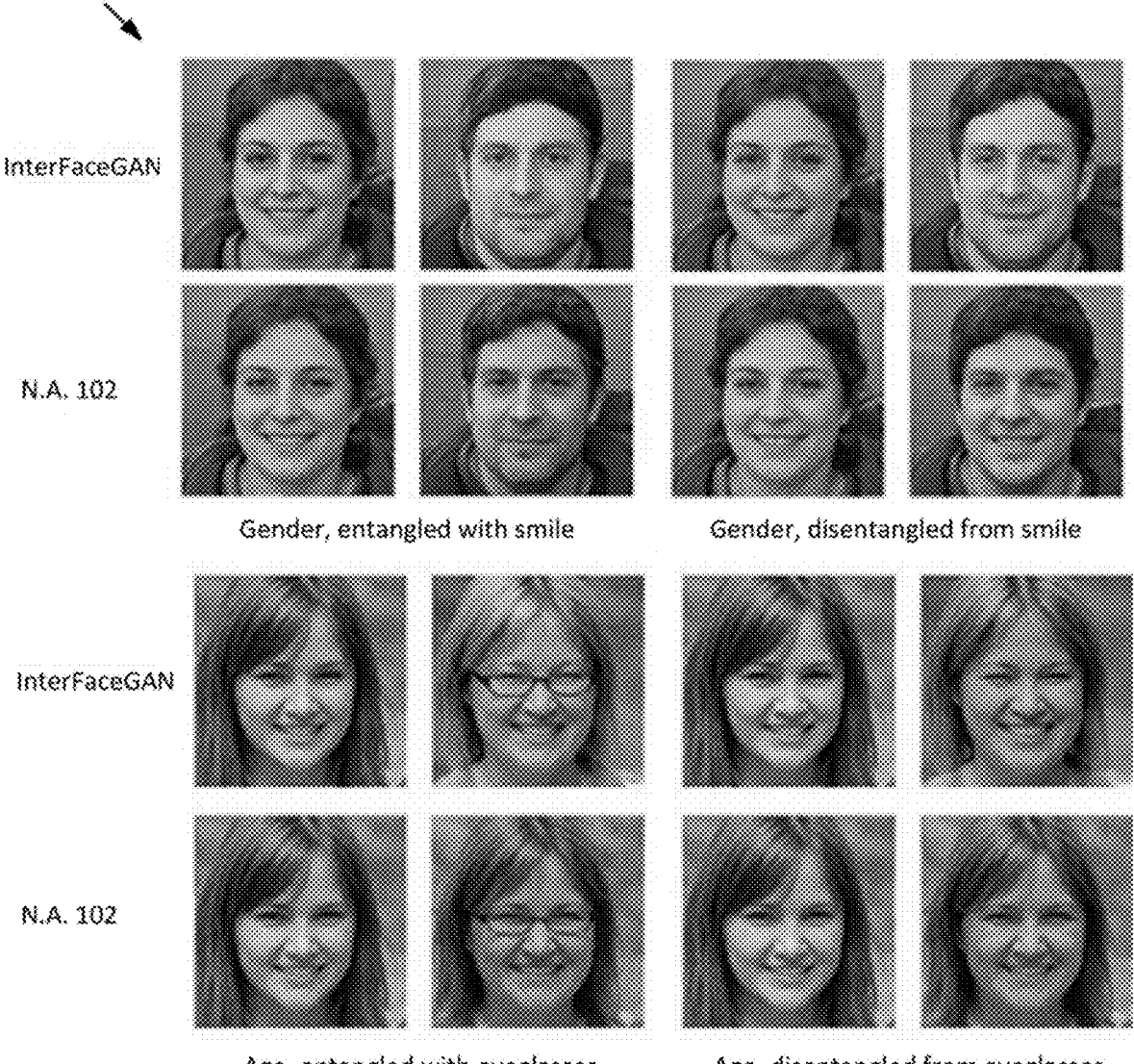
FIG. 7 is a table of images showing a comparison of attribute disentanglement results obtained by a previously known controllable neural network and a controllable neural network in accordance with an embodiment herein.

In an embodiment then, to remove dimensions from the gradient $$n_z^k$$

vector that are important to semantic attribute m, hence m is entangled with k, the gradient vector $$n_z^m$$

form is determined. Each dimension of that vector is evaluated (e.g. a form of sort can be performed) to determine the $100^{th}$ largest value, using absolute value for the dimension. This $100^{th}$ largest value becomes threshold t, relative to m when filtering. For each i-th dimension in m's vector that is the same or greater than the $100^{th}$ largest value, that corresponding i-th dimension is set to 0 in k's vector. For each semantic attribute m entangled with k, m's gradient vector is determined and evaluated for t in a like manner and then the respective dimensions are masked in k's gradient vector. Results and Discussions Evaluation results are presented in respect of the disclosed methods, systems and techniques (e.g. on StyleGAN2 [KLA+20] pretrained on the FFHQ dataset [KLA18] of network architecture 102, in accordance with embodiments as described). FIG. 4 shows a table of images presenting manipulation results 400 for 5 attributes: age, pose, gender, eyeglasses and smile. These qualitative examples are edited with learned directions trained on 60 samples per attribute. FIG. 5 shows a table of images 500 showing attribution disentanglement. FIGS. 6 and 7 show respective tables of images 600 and 700 presenting comparative results to other works [SYTZ20, WLS21, HHLP20].

Table 400 shows the manipulation results on 5 different attributes, i.e, single attribute manipulation results. For each group of three samples in a row (e.g. 402), the image in the middle is the original StyleGAN2-synthesized image, and the left/right image correspond to the synthesis result based on the edited original latent code following the negative/ positive direction found in accordance with the method or technique disclosed herein (i.e. as output from network, architecture 102 (via GAN g 108)).

The approach performs well in both negative and positive directions for all attributes. Specifically, for the age attribute, it was noticed that not only is the approach able to create/ remove fine aging effects like wrinkles or acne, but it is also capable of changing the face shape on a high level, while preserving the person's identity well. The approach is also able to add eyeglasses while keeping irrelevant semantics approximately unchanged, which means many realistic image samples can be created with eyeglasses, despite the absence (i.e. lack) of such a semantic attribute in the original FFHQ training data.

Table 500 shows attribute disentanglement results in FIG. 5. For each group of three images at each row (e.g. 502, 504, 506 and 508), the first image on the left (e.g. 502A, 502D, 504A and 504D) is the original StyleGAN2-synthesized image. Adjacent left and right images (502B/502C, 502E/ 502F, 504B/504C and 504E/504F), correspond to the synthesis result (via GAN g 108) based on the edited original latent code following the negative/positive directions found by the method or technique herein (e.g. using relatively smaller and larger interpolation distances). The first two rows 502 and 504 illustrate that the aging direction is entangled with the eyeglasses direction. By excluding important dimensions for eyeglasses classification from the aging direction during optimization, the two attributes are successfully disentangled (e.g. row 504) while achieving similar aging results. Similarly, for the last two rows 506 and 508, the approach excluding important dimensions as disclosed herein successfully finds new directions where the gender direction is less entangled with smile.

It was noticed that although controls found by the method or technique disclosed herein are generally independent, failure cases still exist, where manipulating one semantic affects another, and the most common entanglements are age with eyeglasses and gender with smile. The results indicate that through excluding the important dimensions responsible for the change in logits of the entangled attribute during optimization, a slightly different direction where the irrelevant semantic is less affected yet the target semantic is still successfully manipulated could be found. Comparisons Results from methods and/or techniques taught in the present application can be compared to InterFaceGAN [SYTZ20] and GANSpace [HHLP20], for example, on three semantic attributes: smile, gender and age. Attributes not supported by some of the previously known methods and implementations are not shown. For [SYTZ20], SVM boundaries were using the same training data used to train gan g and the auxiliary networks of FIG. 1. For [HHLP20] the official released directions were used. Table 600 visualizes in FIG. 6 directions found by each of the three implementations where the first two are previously known and the bottom row shows results in accordance with an embodiment herein (e.g. using network architecture 102 having GAN g 108 and the auxiliary networks 110). For each group of three samples in a row, the image in the middle is the original StyleGAN2-synthesized image, the left and right image correspond to the synthesis result based on the edited original latent code with directions found by each method to decreased/increased target semantic scores.

Overall, the disclosed method herein outperforms the unsupervised GANSpace method, which generates less realistic images with non-obvious change in target semantics, and finds directions similar to InterFaceGAN. Nevertheless, it is noticed that the disclosed method herein is better at disentangling, attributes with Grad-CAM inspired channel filtering, compared to the conditional manipulation technique proposed by [SYTZ20], which adjusts the target direction by subtracting its projected vector onto the direction for editing the entangled semantic, and some examples are shown in FIG. 7.

Table 700 (FIG. 7) showing a comparison of attribute disentanglement results for the disclosed method herein and only one prior known method—InterFaceGAN [SYTZ20], The disclosed method herein better disentangles the attributes during manipulation. In the gender-smile entanglement example of the first two rows, the smile attribute is better preserved when editing gender in the second of such rows (the disclosed method herein), In the age-eyeglasses entanglement example of the bottom two rows, the disclosed method herein finds disentangled control that better preserves irrelevant semantics, e.g., the person's facial expression and hairstyle.

An example of the use of GANS is shown and described in Applicants U.S. patent application Ser. No. 16/683,398, filed Nov. 14, 2019 and entitled "System and Method for Augmented Reality by translating an image using Conditional cycle-consistent Generative Adversarial Networks (ccGans)", which is incorporated herein by reference.

In an embodiment, disclosed technologies and methodologies include developer related methods and systems to define (such as through conditioning) a CNN architecture comprising a GAN g and auxiliary classifiers f for classifying semantic attributes. The GAN is controllable to interpolate for the semantic attributes as trained. User related methods and systems are also shown such as where the trained generator model (e.g. generator (x)) is used at a run-time to process a source image x for image to image translation to obtain a synthesized image x'=g(x) having (or not) a particular semantic attribute (or attributes).

Figure 8:
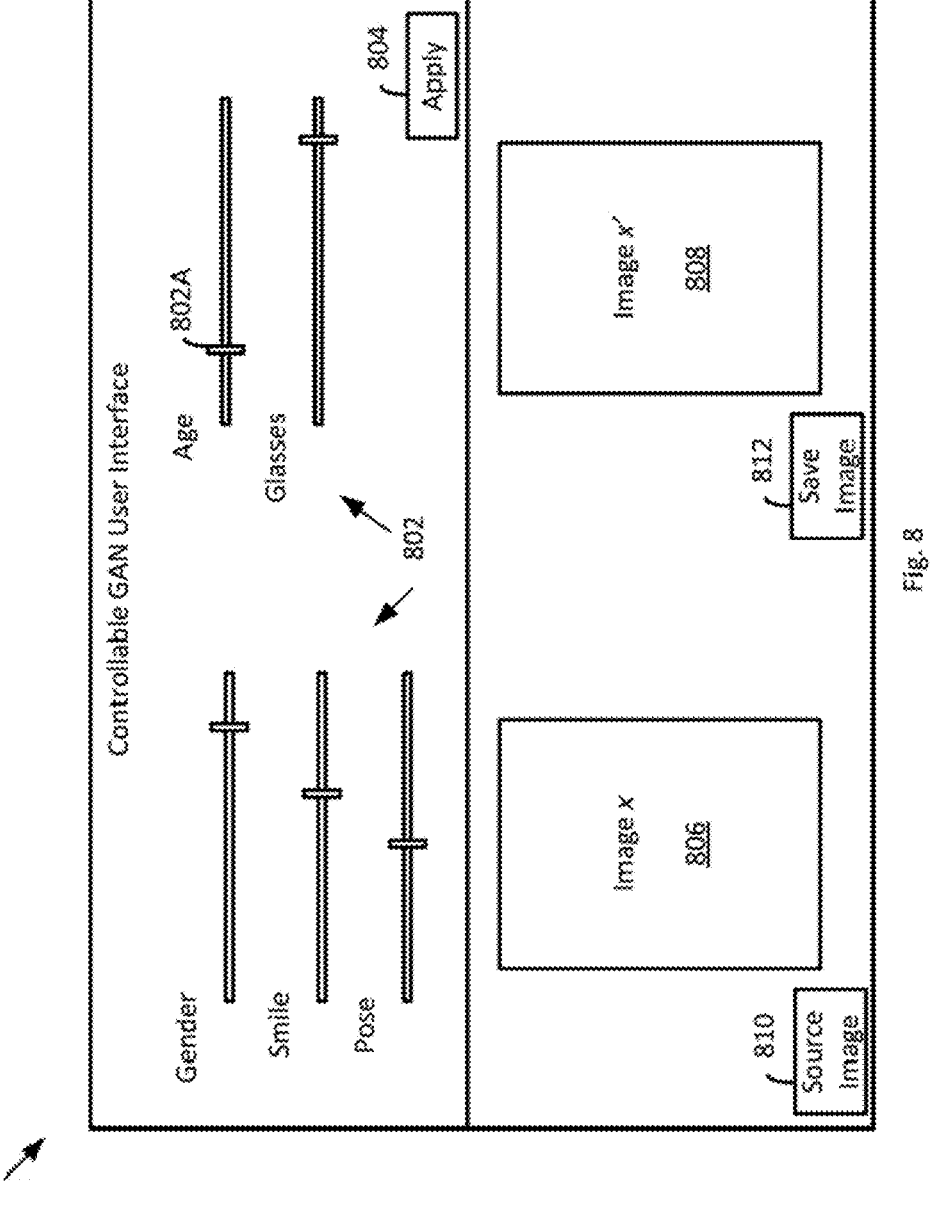
FIG. 8 is a block diagram of a graphical user interface (GUI) to produce a synthesized image from a source image using a controllable GAN, in accordance with an embodiment.

FIG. 8 is a block diagram of a GUI 800, in accordance with an embodiment, GUI 800 may be presented via a display device (not shown). In an embodiment a user can specify the target semantic attribute(s) and the desired amount of the attribute. For example, +smile, –age can identify the attributes and an amount such as a percentage can specify an amount to be present in the synthesized image when the generator is invoked. As the interpolation process is continuous, the pre-trained image classifiers can be used to quantify the amount of the semantic attribute (or amount of change) and find a desired manipulation strength.

GUI 800 shows a plurality of input controls 802 provided to receive selective input for each target semantic attribute for which the CNN architecture 102 was configured and trained. In the present embodiment, each input control (e.g. 802A) shows a slider type control fora respective single attribute and to identify granular input. Other types of input controls (radial controls, text boxes, buttons, etc.) may be used such as for granular or other input Controls may receive a % value, a range selection, a scalar or other value. For example, an age attribute may be associated to an integer range and accept granular inputs approximating to age in years or decades, etc. Others may select relative ranges for the amount of presence of the attribute—small, medium, large—for example. These relative ranges can be associated to respective granular values such as 15%, 50%, and 85%, or other values.

Via a selection of an "Apply" control 804, the semantic attribute input or inputs are applied when invoking the generator. The generator's output is controlled by semantic attribute controls derived from the respective auxiliary network semantic attribute classifiers. The semantic attribute input(s) are applied via these attribute controls to a source image x (806) to generate a synthesized image x' 808 (e.g. an output image). The synthesized image can be represented as x'=g(x), as controlled by the attribute controls. And the attribute controls are responsive to the semantic attribute input from interface controls 802. Though all available semantic attributes have a control, a user may elect not to change an attribute and thus the generator need not interpolate along a direction identified within an associated semantic control.

A source image 806 can be identified for use (e.g. uploaded, copied from a storage, obtained via a camera input to obtain a selfie, etc.) via a "source image" control 810. The synthesized image x' 808 obtained can be saved via a "save image" control 812.

In an embodiment, prior to applying the controls when the generator is invoked, the attributes are disentangled so that the synthesized image is generated with minimized entanglement. In an embodiment, disentanglement can be enabled or disabled via a one or more controls (not shown). For example, in an embodiment, age and eyeglasses can be selectively disentangled or smile and gender selectively disentangled or both such entanglements can be disentangled.

Though individual semantic attribute controls are provided for each trained attribute in the illustrated embodiment, in an embodiment (not shown), fewer controls (e.g. for only a single attribute or two attributes, etc.) are provided. Though separate controls are provided for the individual attributes, in an embodiment (not shown), a single control can be provided for combined attributes (e.g., age and gender). Multi-attribute control is computed by vector arithmetic. To make a face with less smile, more eyeglasses, older (more age), the GUI is configured to receive the inputs for the respective directions, namely –smile, +eyeglasses, +age. In accordance with an embodiment of operations of a computing device, the inputs are associated to respective gradient vectors (of associated semantic attribute controls) and the vectors are added up, and normalized. The generator interpolates (linearly) along the computed direction (i.e. combined directions) to produce the output image.

In an embodiment, the GUI is provided by a first computing device and the generator is provided by another computing device remotely located relative to the first computing device. The other computing device can provide the controllable GAN generator as a service. The first computing device providing the GUI is configured to communicate the input image and semantic attribute direction inputs (e.g. as percent values or other inputs) to the remotely located computing device providing (e.g. executing) the generator. Such a remotely located computing device can provide an application programming interface (API) or other interface to receive the source image (or a selection) and the semantic attribute direction inputs. The remotely located computing device can compute the direction vector and invoke the generator applying the semantic attribute controls. In an alternative embodiment, the computing device providing the GUI can be the same as the computing device providing the generator.

In an embodiment, in addition to developer (e.g. used at training time) and target (used at inference time) computing device aspects, a person of ordinary skill will understand that computer program product aspects are disclosed, where instructions are stored in a non-transient storage device (e.g. a memory, CD-ROM, DVD-ROM, disc, etc.) that when executed cause a computing device to perform any of the method aspects disclosed herein. In an embodiment, a computing device comprises a processor (e.g. a microprocessor (e.g. a CPU, a GPU, a plurality of any of same), microcontroller, etc.) that executes computer readable instructions such as those stored in the storage device. In an embodiment, the computing device comprises (for example "purpose built") circuitry that executes the functions of the instructions, for example, without the need to read such instructions.

Also shown and described are e-commerce system related aspects. A user's computing device, in an embodiment, is configured as a client computing device in relation to the e-commerce system. The e-commerce system, for example, stores a computer program for such a client computing device. Thus the e-commerce system has as a component thereof a computer program product, which product stores instructions which when executed by (e.g. a processing unit of) the client computing device configures such a client computing device. These and other aspects will be apparent.

Figure 9:
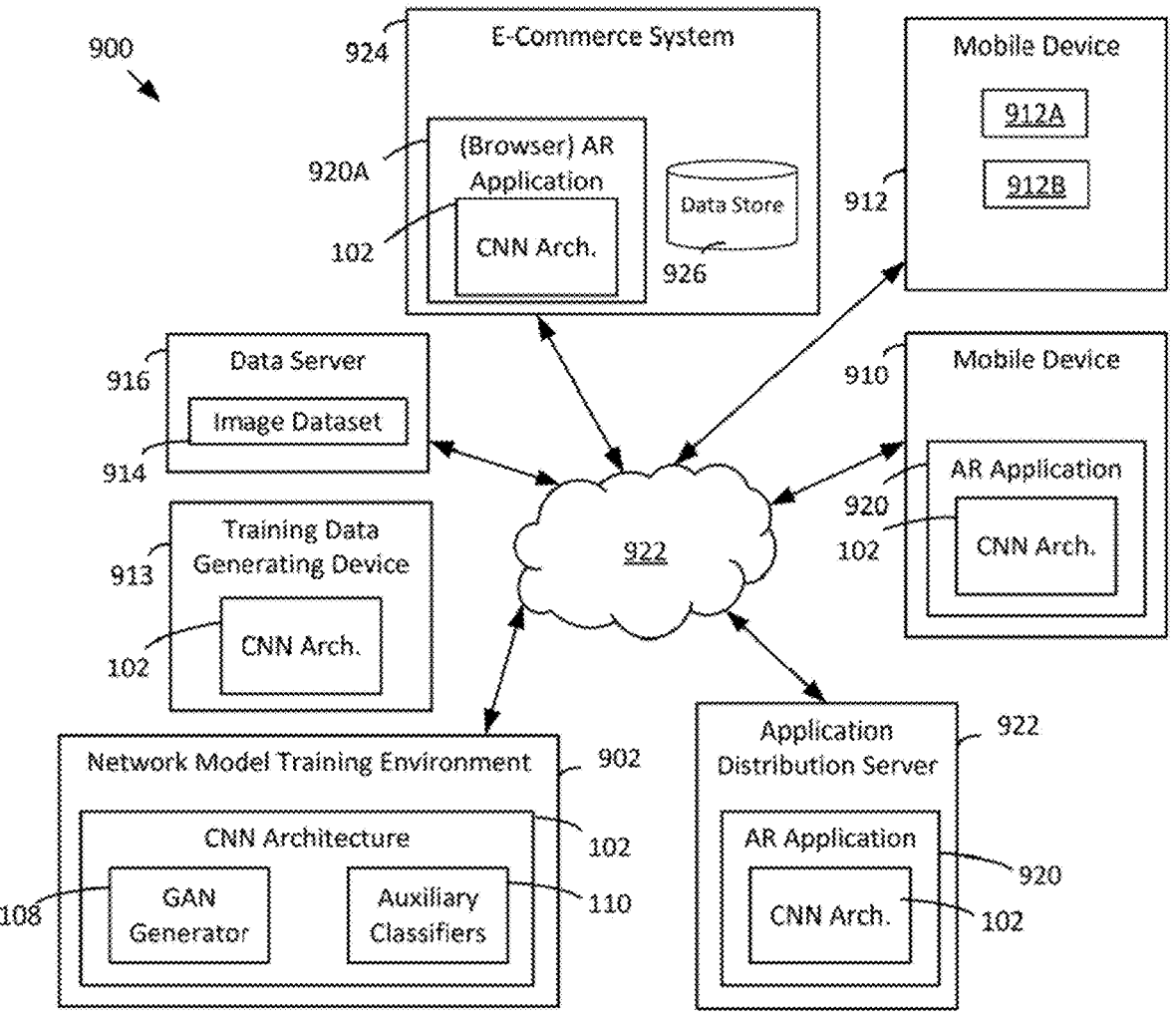
FIG. 9 is a block diagram of a computer system, in accordance with an embodiment.

FIG. 9 is a block diagram of a computer system 900. In an embodiment, computer system 900 comprises a plurality of computing devices which, in an embodiment, includes servers, developer computers (PCs, laptops, etc.) and mobile devices such as smartphones and tablets, etc. There is shown a network model training environment 902 comprising hardware and software to define and configure, such as through conditioning, a GANs-based CNN architecture 102. Architecture 102 comprises a GAN-based generator 108 (e.g. generator g) and an auxiliary network of classifiers 110 (e.g. a plurality of mapping functions $f$). In an embodiment, the GAN and mapping functions are co-conditioned and latent space z for the GAN is updated based upon results of the semantic functions as noted.

In an embodiment, the generator 108 and auxiliary network 110, collectively CNN 102, once trained, is provided for use on a target device such as one of the mobile devices 910, 912 of the system 900 or other devices such as 913. Mobile devices 910 are representative user computing devices, for example, consumer users, it is understood that such users may use other forms of computing device such as a desktop computer, workstation etc. Device 913 represents a computing device to preform training data generating (hence a training data generating device). In this embodiment, such a computing device employs generator 108 to generate additional image data which can be easily labelled with semantic attributes and can be used to train a network model (e.g. in a supervised manner). The form factor of device 913 can be a server, a laptop, a desktop, etc. and need not be a consumer type mobile device such as a tablet, smartphone, etc.

In an embodiment, network model training environment 902 employs, at least in part, a GAN model (generator 108) that is pre-trained for the image task (e.g. face image generation). The generator 108 is pre-trained such as by using an image dataset 914 stored at a data server 916. In an embodiment, the generator 108 is a model developed "in-house". In an embodiment, generator 108 is publicly available such as via an open source license. The dataset can be similarly developed and available. Depending on the type of image task and network architecture (e.g. supervised), the training is supervised and the dataset annotated according for such training. In other scenarios, the training is unsupervised and the data defined accordingly. In an embodiment, the GAN model (generator 108) is further conditioned in its form as shown in FIG. 1A, using, for example, labelled face images for semantic attributes.

In an embodiment, the generator 108 and auxiliary network 110 are incorporated into an augmented reality (AR) application 920. Though not shown, in an embodiment, the application is developed using an application developer computing device for particular target devices having particular hardware and software, particularly operating system configuration. In an embodiment, the AR application 920 is a native application configured for execution in a specific native environment such as one defined for a particular operating system (and/or hardware). In an embodiment, the AR application 920 takes the form of a browser-based application, for example, configured to execute in a browser environment of the target device.

In an embodiment, the AR application 920 is distributed (e.g. downloaded) by user devices such as mobile devices 910 and 912. Native applications are often distributed through an application distribution server 922 (e.g. a "Store" operated by a third party service), though this is not necessary.

In an embodiment (not shown), AR application 920 does not include CNN architecture 102 per se (does not include the generator and auxiliary network). Rather the application is configured with an interface to communicate with a remote device providing these components as a service (not shown), for example, as a cloud-based service. Storage and execution of the generator and auxiliary network is resource intensive and can be too large/demanding for some computing devices. Other reasons may also factor into the paradigm of the AR application.

In an embodiment, the AR application 920 is configured to provide an augmented reality experience (for example via an interface) to a user. For example, an effect is provided to an image via processing by the generator 108. The mobile device comprises a camera (not shown) to capture an image (e.g. a still or video image, whether a selfie image or not). In an embodiment, the effect is applied to the image, for example, to the video image, in a real-time manner (and displayed on a display device of the mobile device) to simulate an effect on a user as the video is captured. As the position of the camera is changed, the effect is applied in response to the image(s) of the video as captured to simulate the augmented reality. As will be appreciated, real-time operation is constrained by processing resources. In an embodiment, an effect is not simulated in real-time but is delayed, which may impact the augmented reality experience.

In an embodiment, the computing devices are coupled for communication via one or more networks (e.g. 922), which comprise wireless networks or otherwise, public networks or otherwise, etc.

By way of example, but without limitation, an e-commerce system 924 is web-based and provides a browser-based AR application 920A as a component of an e-commerce service provided by the e-commerce system 924. E-commerce system 924 comprises a configured computing device and a data store 8926 (e.g. a database or other configuration). Data store 926 stores data about products, services, and related information (e.g. techniques for applying a product). Data store 926 or other data storage devices (not shown) stores recommendation rules or other forms of product and/or service recommendations, etc. to assist a user to choose among available products and services. The products and services are presented via a user-experience interface displayed on a user's (mobile) computing device. It will be appreciated that the e-commerce system 924 is simplified.

In an embodiment, browser-based AR application 920A (or AR application 920) provides an augmented reality customer experience such as to simulate a product, technique or service provided or facilitated by the e-commerce system 924. It will be understood that AR application 920, in the embodiment, is also configured to provide e-commerce services such as via a connection to e-commerce service 924.

By way of example, but without limitation, a product comprises a cosmetic (e.g. makeup) product, an anti-aging or rejuvenation product, and a service comprises a cosmetic, an anti-aging or a rejuvenation service. A service comprises a treatment or other procedure. The product or service relates to a portion of a human body such as a face, hair or nails. In an embodiment, a computing device (such as mobile device 912) so configured thus provides a face-effect unit 912A including processing circuitry configured to apply at least one facial effect to the source image and to generate one or more virtual instances of an applied-effect source image (e.g. displayed) on an e-commerce interface of the computing device that is facilitated by the e-commerce system. In an embodiment, the face-effect unit 912A utilizes the generative adversarial network (GAN)-based generator OA and auxiliary network 110 such as is described herein to produce the applied-effect source image. In an embodiment, the computing device provides a user-experience unit 912B including processing circuitry to determine at least one product or service from the data store 926 and to generate one or more virtual instances of a recommendation or an e-commerce interface to purchase products or services. In an embodiment, the at least one product is associated with a respective facial effect and the face-effect unit applies the respective facial effect to provide a virtual try on experience.

In an embodiment, the user experience unit 912B is configured to present a graphical user interface (e.g. browser based or otherwise) to work with the computing device 912 and the e-commerce system 924. In an embodiment, the e-commerce system 924 is thus configured to provide the AR application for execution by client computing devices such as a mobile device (e.g. 912) and is cooperatively configured to provide e-commerce services to the client computing device to facilitate (product/service) recommendations for AR simulation via the client computing device (e.g. 8912) and facilitate purchases.

Thus, any of the computing devices, but particularly the mobile devices, provide a reputing device to translate an image from a first domain space to a second domain space. The computing device comprises a storage unit storing a generative adversarial network (GAN)-based generator (g), configured to generate images controlled for semantic attributes. In an embodiment, the computing device comprises a processing unit configured to (e.g. via the AR application 920): receive the source image; receive input to identify at least one semantic attribute to be controlled, for example, including input to refine the semantic, attribute (e.g. a percent); provide the image to the generator g to obtain a synthesized (e.g. new) image responsive to the semantic attribute input; and provide the new image for presenting.

In an embodiment the generator is configured to synthesize a particular semantic attribute that comprises one of: a facial feature comprising age, gender, smile, or other facial feature; a pose effect; a makeup effect; a hair effect; a nail effect; a cosmetic surgery or dental effect comprising one of a rhinoplasty, a lift, blepharoplasty, an implant, otoplasty, teeth whitening, teeth straightening or other cosmetic surgery or dental effect; and an appliance effect comprising one of an eye appliance, a mouth appliance, an ear appliance or other appliance effect.

In an embodiment, the synthesized output of generator g (e.g. the synthesized or new image) is provided to a second network model (e.g. as an unillustrated component of AR application 920 or 920A), for example, for a face editing task. The second network model can comprise a second generator or a feature detector and a simulator to apply an effect (e.g. producing a further new image). The effect can be presented in an AR interface. In an embodiment, the processing unit is configured to provide the synthesized image (or a further new image defined therefrom) in an augmented reality interface to simulate an effect applied to the image. In an embodiment, the effect comprises any of a makeup effect, a hair effect, a nail effect, a cosmetic surgery or dental effect, an appliance effect or other simulation effect applied. In an embodiment, the source image comprises an applicable portion (e.g. face, hair, nails or body portion) of a subject such as a user of the device. For example, an input image can be processed by generator to simulate an age change and the effects pipeline can process the synthesized image exhibiting the age change to apply a makeup and/or hair effect to the synthesized image.

The network model training environment 902 provides a computing device configured to perform a method such as a method to configure by conditioning a GANs-based generator and an auxiliary network of classifiers that share the same latent space. It will be understood that embodiments of the computing device aspect of the network model training environment 902 and any related embodiments of, for example, the generator or model, apply to the training method aspect, with suitable adaptation.

FIG. 10 is a flowchart of operations 1000 in accordance with an embodiment herein. The operations provide a method such as for training (e.g. through conditioning) in an embodiment. At step 1002, operations configure through conditioning a generative adversarial network (GAN)-based generator g 108 along with training auxiliary network 110. The training updates the latent space Z. In an embodiment, the generator y 108 along with, training auxiliary network 110 are trained with labelled images having respective semantic attribute labels. The co-training trains the auxiliary network 110 using latent space Z and the respective gradients of the auxiliary network 110 (e.g. where each semantic attribute has a corresponding binary classifier) are useful to control the operation of the GAN-based generator g when generating an image.

At step 1004, operations provide the generator g 108 and auxiliary network 110 for use by a computing device to generate an image. A related computed device and computer program product aspect will be apparent as will other aspects.

FIG. 11 is a flowchart of operations 1100 in accordance with an embodiment herein. Operations 1100 are performed by a computing device such as device 910, 912, 913, or 924.

At 1102 operations provide a generator and an auxiliary network sharing a latent space. The generator is configured to generate synthesized images exhibiting human-interpretable semantic attributes. The auxiliary network comprises a plurality of semantic attribute classifiers including a semantic attribute classifier for each semantic attribute to be controlled (by the generator) when generating a synthesized image from a source image. Each semantic attribute classifier is configured to classify a presence of (an associated) one of the semantic attributes in images and provide a meaningful direction for controlling the one of the semantic attributes in the synthesized images of the generator.

When invoking the generator to generate the synthesized image from the source image, operations at 1104 apply a respective semantic attribute control to control a respective semantic attribute in a synthesized image generated from a source image. The respective semantic attribute control is responsive to the meaningful direction provided by the classifier associated with the semantic attribute.

Practical application of the generator g includes generating and providing (large) amounts of labelled synthetic data more accessible for use to train (or further train) one or more network models. For example such data can be useful to improve results of a face-editing model. For instance, for a hair segmentation task, a segmentation model may be initially trained on imbalanced data with hair colors distributed unevenly, which leads to unsatisfying segmentation results for a minority hair color group. To address this issue and create a more balanced dataset, the generator g and/or techniques herein can be employed to edit hair colors of existing labelled data and generate abundant data for the minority group. Thus a use of a generator 108 (and network 110) includes generating labelled synthetic images for training and model and may further include training the model with the labelled synthetic images.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCE

[ACB17] Martin Arjovsky, Soumith Chintala, and Léon Bottou. Wasserstein generative adversarial networks. In *International conference on machine teaming*, pages 214-223. PMLR, 2017.

[BDS18] Andrew Brock, Jeff Donahue, and Karen Simonyan. Large scale gan training for high fidelity natural image synthesis. *arXiv preprint arXiv:*1809.11096, 2018.

[CCK+18] Yunjey Choi, Minje Choi, Munyoung Kim, Jung-Woo Ha, Sunghun Kim, and Jaegul Choo. Stargan: Unified generative adversarial networks for multi-domain image-to-image translation. In *Proceedings of the IEEE conference on computer vision and pattern recognition*, pages 8789-8797, 2018.

[CVB21] Anton Cherepkov, Andrey Voynov, and Artem Babenko. Navigating the gan parameter space for semantic image editing. In *Proceedings of the IEEE/CVF Conference on Computer Vision and Pattern Recognition*, pages 3671-3680, 2021.

[GPAM+ 14] Ian Goodfellow, Jean Pouget-Abadie, Mehdi Mirza, Bing Xu, David Warde-Farley, Sherjil Ozair, Aaron Courville, and Yoshua Bengio. Generative adversarial nets. *Advances in neural information processing systems,* 27, 2014.

[HHLP20] Erik Härkönen, Aaron Hertzmann, Jaakko Lehtinen, and Sylvain Paris. Ganspace: Discovering interpretable gan controls. *arXiv preprint arXiv:*2004.02546, 2020.

[HRU+17] Martin Heusel, Hubert Ramsauer, Thomas Unterthiner, Bernhard Nessler, and Sepp Hochreiter. Gans trained by a two time-scale update rule converge to a local nash equilibrium. *Advances in newel information processing systems,* 30, 2017.

[KLA18] Tero Karras, Samuli Leine, and Timo Aila. A style-based generator architecture for generative adversarial networks. *arXiv preprint arXiv:*1812.04948, 2018.

[KLA+20] Tero Karras, Samuli Laine, Miika Aittala, Janne Helisten, Jaakko Lehtinen, and Timo Aila. Analyzing and improving the image quality of stylegan. In *Proceedings of the IEEE/CVF Conference on Computer Vision and Pattern Recognition*, pages 8110-8119, 2020.

[LLWT15] Ziwei Liu, Ping Luo, Xiaogang Wang, and Xiaoou Tang. Deep learning face attributes in the wild. In *Proceedings of the IEEE international conference on computer vision*, pages 3730-3738, 2015.

[PBH20] Antoine Plumerault, Hervé Le Borgne, and Céline Hudelot. Controlling generative models with continuous factors of variations. *arXiv preprint arXiv:*2001.10238, 2020.

[SCD+17] Ramprasaath R Selvaraju, Michael Cogswell, Abhishek Das, Ramakrishna Vedantam, Devi Parikh, and Dhruv Batra. Grad-cam: Visual explanations from deep networks via gradient-based localization. In *Proceedings of the IEEE International conference on computer vision*, pages 618-626, 2017.

[SYTZ20] Yujun Shen, Ceyuan Yang, Xiaoou Tang, and Bolei Zhou. Interfacegan: Interpreting the disentangled face representation learned by gans. *IEEE transactions on pattern analysis and machine intelligence,* 2020.

[SZ21] Yujun Shen and Bolei Zhou. Closed-form factorization of latent semantics in gans. In *Proceedings of the IEEE/CVF Conference on Computer Vision and Pattern Recognition*, pages 1532-1540, 2021.

[VB20] Andrey Voynov and Artem Babenko. Unsupervised discovery of interpretable directions in the gan latent space. In *International Conference on Machine Learning*, pages 9786-9796. PMLR, 2020.

[WDB+19] Yan Wu Jeff Donahue, David Balduzzi, Karen Simonyan, and Timothy Lillicrap. Logan: Latent optimisation for generative adversarial networks. *arXiv preprint arXiv:*1912.00953, 2019.

[WLS21] Zongze Wu, Dani Lischinski, and Eli Shechtman. Stylespace analysis: Disentangled controls for stylegan image generation. In *Proceedings of the IEEE/CVF Conference on Computer Vision and Pattern Recognition*, pages 12863-12872, 2021.

[ZKL+ 16] Bolei Zhou, Aditya Khosla, Agata Lapedriza, Aude Oliva, and Antonio Torralba. Learning deep features for discriminative localization. In *Proceedings of the IEEE conference on computer vision and pattern recognition*, pages 2921-2929, 2016.

The invention claimed is:

1. A method comprising:
generating a synthesized image (g(z')) using a generator (g) having a latent code (z) which generator g manipulates a target semantic attribute (k) in the synthesized image, wherein the generating comprises:
discovering a semantically meaningful data direction at z for the target semantic attribute k, the semantically meaningful data direction identified from an auxiliary network classifying respective semantic attributes at z, including target semantic attribute k, and the auxiliary network sharing a latent space Z with generator g, and where z∈Z;
defining z' by optimizing latent code z responsive to the semantically meaningful direction for the target semantic attribute k; and
disentangling data directions by removing out, from dimensions of the semantically meaningful data direction at z of the target semantic attribute k, those important dimensions of respective semantically meaningful data directions of each other semantic attribute (m, m≠k) entangled with the target semantic attribute k, wherein a particular dimension is important based on its absolute gradient magnitude; and
outputting the synthesized image.

2. The method of claim 1, wherein the auxiliary network comprises a set of binary classifiers, one for each semantic attribute that the generator is capable to manipulate, the auxiliary network co-trained to share the latent space Z with generator g.

3. The method of claim 1, wherein the respective semantically meaningful data directions comprise a respective dimensional data vector obtained from each individual classifier, each vector comprising a direction and rate of the fastest increase in the individual classifier.

4. The method of claim 1, wherein the removing comprises evaluating each dimension of each semantically meaningful data direction to be disentangled from the semantically meaningful data direction of the target semantic attribute k; if a particular dimension exceeds a threshold value, setting a value of the corresponding dimension in the semantically meaningful data direction of the target semantic attribute k to a zero value.

5. The method of claim 4, wherein latent code z is optimized as:

$$z' = z + \alpha n_z^{k'},$$

wherein:

$$n_z^k$$

is a vector representing the semantically meaningful data direction of the target semantic attribute k before filtering;

$$n_z^{k'}$$

is a vector representing the semantically meaningful data direction of the target semantic attribute k after filtering; and
α is a hyperparameter that controls the interpolation direction and step size.

6. The method of claim 1, comprising repeating operations of discovering, defining and optimizing in respect of latent code z' to further manipulate sematic attribute k.

7. The method of claim 1, wherein the generating of the synthesized image manipulates a plurality of target semantic attributes in the synthesized image, and the method comprises discovering respective semantically meaningful data directions at z for each of the plurality of the target semantic attributes as identified from the auxiliary network classifying each of the plurality of the target semantic attributes at z, and optimizing z in response to each of the semantically meaningful data directions.

8. The method of claim 1 comprising training another network model using the synthesized image.

9. The method of claim 1, comprising receive an input identifying the target semantic attribute to be controlled relative to a source image.

10. The method of claim 9, wherein the input comprises a granular input to determine an amount of the target semantic attribute to be applied when generating the synthesized image.

11. The method of claim 1 comprising any one or more of:
providing the generator and the auxiliary network to generate the synthesized images as a service;
providing an e-commerce interface to purchase a product or service;
providing a recommendation interface to recommend a product or service; or
providing an augmented reality interface using the synthesized image to provide an augmented reality experience.

12. The method of claim 1, wherein the target semantic attribute comprises one of: a facial feature comprising age, gender, smile, or other facial feature; a pose effect; a makeup effect; a hair effect; a nail effect; a cosmetic surgery or dental effect comprising one of a rhinoplasty, a lift, blepharoplasty, an implant, otoplasty, teeth whitening, teeth straightening or other cosmetic surgery or dental effect; or an appliance effect comprising one of an eye appliance, a mouth appliance, an ear appliance or other appliance effect.

13. A computer implemented method comprising executing the steps comprising:
providing a generator and an auxiliary network sharing a latent space, the generator configured to generate synthesized images exhibiting semantic attributes and the auxiliary network comprising a plurality of semantic attribute classifiers including a semantic attribute classifier for each semantic attribute to be controlled for generating a synthesized image from a source image, each semantic attribute classifier configured to classify a presence of one of the semantic attributes in images and provide a semantically meaningful direction for controlling the one of the semantic attributes in the synthesized images of the generator; and generating the synthesized image from the source image using the generator by applying a respective semantic attribute control to control a respective semantic attribute in the synthesized image, the respective semantic attribute control responsive to the semantically meaningful direction provided by the classifier associated with the respective semantic attribute;

wherein to generate the synthesized image uses a latent code z' defined by optimizing a latent code z of the latent space responsive to the semantically meaningful direction for the respective semantic attribute, including disentangling data directions by removing out, from dimensions of the semantically meaningful data direction of the respective semantic attribute, those important dimensions of respective semantically meaningful data directions of each other semantic attribute entangled with the respective semantic attribute, wherein a particular dimension is important based on its absolute gradient magnitude.

14. The method of claim 13, wherein the semantically meaningful direction comprises a gradient direction, and the instructions cause the computing device to compute a respective semantic attribute control from a respective gradient direction of the classifier associated with the respective semantic attribute.

15. The method of claim 13, wherein the removing comprises evaluating each dimension of each semantically meaningful data direction to be disentangled from the semantically meaningful data direction of the respective semantic attribute; if a particular dimension exceeds a threshold value, setting a value of the corresponding dimension in the semantically meaningful data direction of the respective semantic attribute to a zero value.

16. The method of claim 13 comprising receiving an input identifying at least one of the respective semantic attributes to be controlled relative to the source image.

17. The method of claim 13 comprising any one or more of:

provide the generator and the auxiliary network to generate the synthesized images as a service;

providing an e-commerce interface to purchase a product or service;

providing a recommendation interface to recommend a product or service; or providing an augmented reality interface using the synthesized image to provide an augmented reality experience.

18. A method comprising the steps of:

providing an augmented reality (AR) interface to provide an AR experience, the AR interface configured to generate a synthesized image from a received image using a generator by applying a respective semantic attribute control input to control a respective semantic attribute in the synthesized image, the respective semantic attribute control input configured to apply a semantically meaningful direction provided by a classifier associated with the semantic attribute, the generator and classifier sharing a latent space;

wherein to generate the synthesized image uses a latent code z' defined by optimizing a latent code z of the latent space responsive to the semantically meaningful direction for the respective semantic attribute, including disentangling data directions by removing out, from dimensions of the semantically meaningful data direction of the respective semantic attribute, those important dimensions of respective semantically meaningful data directions of each other semantic attribute entangled with the respective semantic attribute, wherein a particular dimension is important based on its absolute gradient magnitude; and receiving the received image and providing the synthesized image for the AR experience.

19. The method of claim 18 comprising processing the synthesized image using an effects pipeline to simulate an effect and providing the synthesized image with the simulated effect for presenting in the AR interface.

* * * * *